United States Patent [19]

Schubert

[11] Patent Number: 4,976,978
[45] Date of Patent: Dec. 11, 1990

[54] METHOD OF MANUFACTURING A ROUNDISH FOOD PRODUCT

[75] Inventor: Günther Schubert, Reken, Fed. Rep. of Germany

[73] Assignee: Thomas J. Lipton, Inc., Englewood Cliffs, N.J.

[21] Appl. No.: 226,612

[22] Filed: Aug. 1, 1988

[30] Foreign Application Priority Data

Aug. 4, 1987 [EP] European Pat. Off. ....... 87 201477.4
Aug. 4, 1987 [EP] European Pat. Off. ....... 87 201478.2

[51] Int. Cl.⁵ .............................................. A23P 1/14
[52] U.S. Cl. .................................. 426/295; 426/297; 426/516; 426/517; 426/518
[58] Field of Search ............... 426/102, 101, 295, 289, 426/516, 297, 517, 518; 264/15; 425/297, 104, 332, 222

[56] References Cited

U.S. PATENT DOCUMENTS

| Re. 16,712 | 8/1927 | Cloud | 426/289 |
|---|---|---|---|
| 1,470,524 | 10/1923 | Burt | 426/289 |
| 1,718,997 | 7/1929 | Burt | 426/101 |
| 2,704,722 | 3/1955 | Barton | 426/518 |
| 2,787,978 | 4/1957 | Faerber . | |
| 2,879,163 | 3/1959 | Anson | 426/517 |
| 3,029,750 | 4/1962 | Burt . | |
| 3,036,533 | 5/1962 | Burt . | |
| 3,123,498 | 3/1964 | Ter Braak et al. | 118/19 |
| 3,303,796 | 2/1967 | Novissimo | 107/54 |
| 3,381,658 | 5/1968 | Parambo . | |
| 3,544,332 | 12/1970 | Leebens | 426/295 |
| 3,647,478 | 3/1972 | Minor | 426/518 |
| 3,899,275 | 8/1975 | Atwood | 425/333 |
| 4,440,701 | 4/1984 | Ohki et al. | 264/15 |
| 4,795,650 | 1/1989 | Groobert | 426/516 |
| 4,822,627 | 4/1989 | Clegg | 426/101 |
| 4,851,248 | 7/1989 | Simelunas | 426/516 |
| 4,877,623 | 10/1989 | Hayashi | 426/517 |

FOREIGN PATENT DOCUMENTS

| 7130 | 1/1980 | European Pat. Off. . | |
|---|---|---|---|
| 217409 | 8/1987 | European Pat. Off. . | |
| 1813516 | 7/1969 | Fed. Rep. of Germany . | |
| 3000523 | 7/1981 | Fed. Rep. of Germany . | |
| 3519052 | 1/1986 | Fed. Rep. of Germany . | |
| 2578718 | 9/1986 | France | 426/101 |
| 2594005 | 8/1987 | France | 426/289 |
| 152241 | 7/1986 | Japan | 426/295 |
| 391121 | 4/1933 | United Kingdom . | |
| 450437 | 7/1936 | United Kingdom . | |
| 723859 | 2/1955 | United Kingdom . | |
| 972904 | 10/1964 | United Kingdom . | |
| 2075326 | 11/1981 | United Kingdom . | |

OTHER PUBLICATIONS

Womans Day Encyclopedia of Cookery, vol. 6, 1966, Fawcett Publications, Inc., New York, p. 934.
Ice Cream Field (U.S.), "Country Club Introduces 'Splendors'", Dec. 1958, pp. 21 and 69.

Primary Examiner—Carolyn Paden
Attorney, Agent, or Firm—Brumbaugh, Graves, Donohue & Raymond

[57] ABSTRACT

A method for preparing a food product is disclosed wherein formed food is prepared with a particulate coating. Here a plastic, deformable food material is made from rolling a food in the presence of particulate coating material in a revolving drum to thereby reshape the food particle into a roundish, coated body. The roundish body is preferably spherical, annular or roundish cylindrical. The food material is, for instance, mashed potato, minced fish or dough and preferably an aerated, frozen confection.

8 Claims, 1 Drawing Sheet

METHOD OF MANUFACTURING A ROUNDISH FOOD PRODUCT

BACKGROUND OF THE INVENTION

This invention relates to a method and an apparatus for preparing a roundish, particle-coated food product and to a roundish, particle-coated food product.

A well-known method for preparing a food product, such as ice-cream bonbons, involves carefully shaping a piece of food material, such as ice-cream, followed by coating said piece, for instance with chocolate or another coating material.

In Ice Cream Field, December 1958, pages 21 and 69, and in U.S. Pat. Nos. 3,036,533 and 3,029,750 a spherical ice-cream product is described, produced by moulding ice-cream into balls and coating these balls with particles, such as coconut particles.

GB No. 2 075 326 (Morinaga & Co. Ltd) describes the production of a spherical frozen confection by rotating hard particulate core material in a revolving pan, cooling this material below freezing temperature and adding an aqueous coating material, thereby obtaining a generally spherical product comprising a core of any shape provided with a thick coating layer.

These methods for producing roundish food products suffer from the disadvantage that they either require a pre-moulding step for producing the roundish core or result in a relatively thick coating.

Conijn in DE No. 1 813 516 describes the production of cylindrical or spherical croquettes by rolling a piece of breaded ragout material between relatively moving surfaces. This method is, however, time-consuming and requires the use of expensive equipment.

SUMMARY OF THE INVENTION

It is an object of the invention to provide a novel, industrially applicable method of reshaping plastic, deformable food material and simultaneously coating it to provide a roundish, coated food product.

Therefore, the invention relates to a method for preparing a food product by rolling pieces of plastic, deformable food material in the presence of a particulate coating material in a revolving drum, thereby reshaping them into roundish, coated bodies.

In a preferred embodiment these pieces are formed by extruding a strand of plastic, deformable food material and separating this strand into pieces, particularly by cutting.

The present invention is of particular interest for shaping frozen confection material because of its speed, rendering additional cooling means superfluous.

In this application the expression roundish bodies refers to bodies mainly having curved outer surfaces. Examples of roundish bodies are barrel-shaped pieces, spherical pieces and annular or toroidal pieces. Particularly, the method according to the invention is used to prepare regularly shaped, roundish products, more preferably substantially spherical products.

Rolling is the rotating of the product while being in contact with a rigid body. Preferably, the rolling is carried out in more than one direction.

The expression revolving drum refers to any rotatable hollow body suitable for coating products such as a coating pan, which is rotatable about a horizontal or inclined axis.

As particulate coating material, any particulate material suitable for coating a food product may be used. These coating materials include powders, granules, granulates etc. Preferably, the particle size of the coating material is between 0.001-5 mm. Suitable coating materials include, for instance, flour, milk powder, cocoa powder, wafer crumbs, bread crumbs, nut particles, expanded rice particles, ground, baked, foamed egg-white, fruit particles, edible seed materials, kernels, freeze-dried or spray-dried materials, chocolate particles, coconut particles, etc.

For savoury products, breading material, such as cracker meal, bread crumbs, Japanese crumbs etc., is generally preferred whereas for ice confections wafer crumbs, chopped nuts, chocolate flakes, ground coco and cocoa are preferred.

The coating materials having a particle size in the upper range, e.g. between 1-5 mm, have the advantage that they provide an effective distance between the coated food product cores of some millimeters, thus preventing adherence of the products to each other. Examples of these coating materials are coarse bread crumbs, nut particles etc.

The coating materials having a particle size in the lower range, e.g. between 0.001-1 mm, have the advantage that they provide a uniformly distributed coating, giving an attractive appearance and an effective protection of the product from damage. Examples of such coating materials are flour and cocoa.

Plastic, deformable food materials suitable for use in a method according to the invention are generally viscous food materials such as mashed potato, minced fish paste, ice-cream, milk ice, mellorine, sherbet, dough, vegetable pastes, minced meat, ragout, etc.

The method according to the invention can be used for preparing roundish food products having various sizes. Preferably, the method of the invention is used to prepare food products having a volume of less than 250 ml so that one or more of these products can be used for constituting a one-person portion.

An interesting aspect of a method according to the invention is the possibility of preparing small size ("one-bite") food products, particularly products having a volume of less than 40 cm$^3$, more preferably from 1 to 20 cm$^3$.

For allowing a short rolling time, it is preferred that the starting piece of food material has dimensions which are substantially equal in each main direction, such as a substantially cubical piece or a cylindrical piece having a diameter which substantially equals its length.

The rolling step is carried out in a revolving drum, the axis of rotation being generally horizontal, but most preferably at a small angle to the horizontal. This allows the continuous operation by introducing the food material at one end and discharging it at the other end of the drum.

The invention also relates to an apparatus for preparing a roundish food product comprising a drum mounted for rotation about its axis, means for rotating said drum, means for extruding plastic, deformable material into a strand, means for separating this strand into pieces and means for feeding these pieces and particulate material into the drum.

Preferably, the drum is provided with a profile for distributing the particulate material across the inner surface of the drum. Preferably, this profile is less than 2 mm in height to avoid damage to the structure of the food product.

Most preferred is a profile constituted by a particulate coating having a particle size of less than 2 mm, preferably about 1 mm. Preferably, the coating is arranged in helical areas.

Depending on the nature of the product to be reshaped, the linear speed of rotation of the drum in combination with the amount of particulate coating material can be varied within a broad range. In this context the expression linear speed of rotation refers to the circumferential speed or linear speed of any point on the cylindrical inner surface of the drum.

Usually the speed of rotation will be rather high to allow quick reshaping during coating. It has been found, however, that the speed of rotation has to be determined empirically, depending on the rheology of the food product. At relatively low speed, barrel-shaped products can be obtained. At higher speed, generally spherical shapes are obtained, while at still higher speeds substantially annular or toroidal shapes can be obtained. Intermediate rotational speeds will generate roundish products having a shape which is between a spherical shape and an annular shape, such as a dumbbell-shape, if seen in cross-section.

For food products having a volume of approximately 10 cm$^3$ and a viscosity comparable to ice-cream of $-5°$ C., a linear speed of rotation of between 40 and 60 meter/minute and a residence time in the drum of between 1 and 60 seconds will generally result in substantially spherical products. An increase in speed to between 60 and 150, and in particular to approximately 75 meters per minute, will generally result in substantially annular products.

For taste and keep ability reasons it is often preferred to coat the product with a fluid coating material subsequent to the above-mentioned rolling to form a substantially continuous coating layer around the product.

Suitable fluid coating materials are, for instance, fat-based materials such as oil-in-water emulsions and water-based materials such as egg-white, water, etc. Most preferred is the use of batter material for savoury products and molten chocolate couverture for ice confection products.

Application of the fluid coating material can be carried out by any conventional method, such as e.g. spraying, feeding through a curtain of fluid etc.

Another aspect of the invention is the coating of a product which has previously been coated with a fluid material, with a particulate material. Application of such a particulate coating material improves the texture and appearance of the product. Furthermore, this particulate coating provides an effective distance between the cores of the product when stored in one package so that adherence is prevented.

It is well known in itself to coat e.g. chocolate-coated ice-cream products with a particulate material such as nuts. A problem during this coating is that the chocolate often drips off the product, thus forming a so-called dripping foot. It is highly desired to avoid the formation of such a dripping foot. It has been found that the formation of such a dripping foot is avoided by applying the particulate coating material in a revolving drum as described above.

This method is advantageous in that it is fast and can be carried out continuously.

A preferred method according to the invention involves reshaping a piece of frozen confection material in the presence of a particulate coating material, coating the product thus obtained with a fluid coating material and the product with a second particulate material.

The second particulate coating material is not necessarily the same as the particulate coating material used during rolling. For safeguarding adherence of the second particulate material to the product, the second particulate material is preferably applied shortly after the fluid material so that this still has a fluid or plastic consistency.

BRIEF DESCRIPTION OF THE DRAWING

Preferred embodiments of the invention have been chosen for purposes of illustration and description and are described in the following description and examples and shown in the accompanying drawings:

FIG. 1 shows a cross-section of a substantially spherical ice confection product comprising an ice-cream core 1 provided with a first particulate coating layer 2 of wafer crumbs and a continuous chocolate coating layer 3 and a second particulate coating layer 4 of chopped nuts. The diameter of the product is approximately 30 mm.

FIG. 2 shows a barrel-shaped ice confection comprising an ice-cream core 5 provided with a particulate layer 6 and a syrup layer 7.

FIG. 3 shows a substantially annular fish product comprising a minced fish core 8 provided with a particulate breading layer 9, a batter coating 10 and an outer breading layer 11. The radius is approximately 20 mm and the height 12 mm.

FIG. 4 shows a dumbbell-shaped, cross-sectional view of a mashed potato fill 12 having a particulate breading layer 13.

FIG. 5 schematically shows an apparatus according to the invention for producing the above products comprising a rotatable drum 14, a driving mechanism 15 for rotating said drum, a supply tube 16 for introducing viscous, plastic deformable food-material, a wire-cutting means 17, a chute 18 and for introducing particulate coating material and a discharge end 19 for discharging the reshaped, coated product.

The revolving drum is provided with an inner profile having a height of 1.5 mm and being constituted of spherical particles of glass which are applied along helical areas 20 of the drum 14. An inclined sieve 21 for separating the product from excess particulate coating material is arranged at the discharge end 19 of the drum.

DESCRIPTION OF THE PREFERRED EMBODIMENT

Example 1

Figure 1:
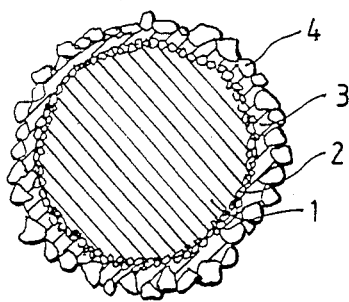
FIG. 1 shows a cross-section of a substantially spherical ice-cream product according to the invention.
Figure 2:
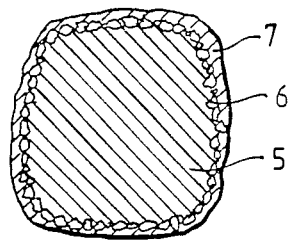
FIG. 2 shows a cross-section of a barrel-shaped ice confection according to the invention.
Figure 3:
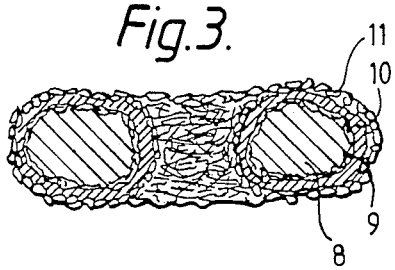
FIG. 3 shows a cross-section of a substantially annular fish product according to the invention.
Figure 4:
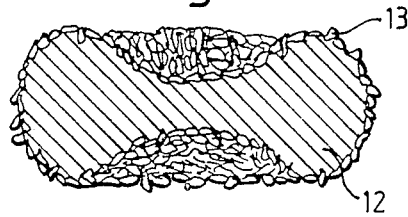
FIG. 4 shows a dumbbell-shaped cross-section of a round potato product according to the invention.
Figure 5:
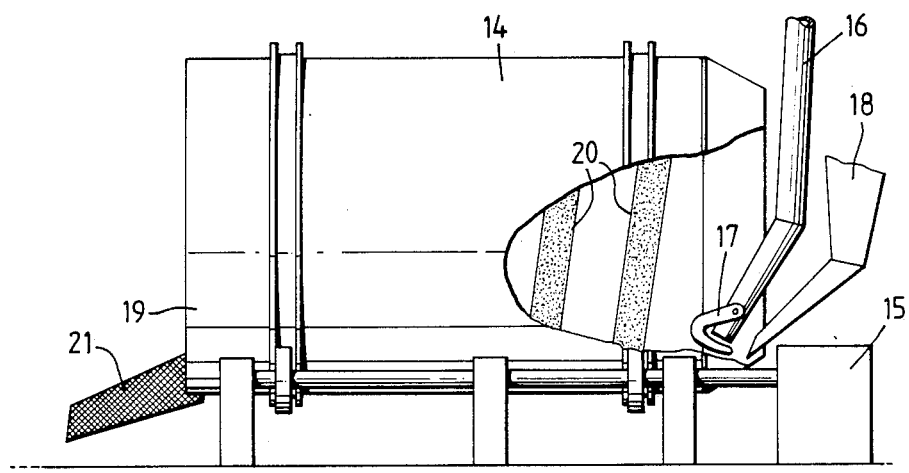
FIG. 5 is a schematic part-sectional side elevation of an apparatus embodying the invention.

Cylindrical pieces of ice-cream having a volume of approximately 7 cm$^3$ are produced by wire-cutting an extruded circular strand of ice-cream having a temperature of $-5°$ C. and an overrun of 120%. The pieces of ice-cream having a diameter of 21 mm and a length of 21 mm are immediately transferred to a revolving drum having a diameter of 60 cm, the interior of which is kept at ambient temperature and which contains wafer crumbs having an average particle size of approximately 2 mm. The revolving drum is rotated about a substantially horizontal axis at a linear speed of 55 m/min. The residence time of the product in the drum is approximately 10 seconds. The resulting products are substantially spherical, the weight ratio of crumbs: ice-cream is about 1:5. The product is subsequently hardened to −20° C. and subsequently coated with a chocolate couverture by feeding it through a curtain of molten chocolate couverture, followed by immediately coating the product for a second time by introducing it into a second rotating drum which contains hazelnut particles having an average particle size of 2.5 mm. The second drum is rotated at a linear speed of 55 m/min; the residence time of the product in the drum is approximately 5 seconds. The resulting product is schematically shown in FIG. 1.

A pointed bag is filled with approximately 10 of these balls and stored at freezing temperatures.

Example 2

Cylindrical pieces of mashed potato having a volume of approximately 3 cm$^3$ are produced by extruding and wirecutting a strand of mashed potato having a temperature of 4° C. and an overrun of 20%. The cylindrical pieces of the mashed potato having a diameter of 18 mm and a length of 12 mm are immediately transferred to a revolving drum having a diameter of 60 cm, the interior of which is kept at ambient temperature and which contains a breading material having an average particle size of 1 mm. The revolving drum is rotated about a substantially horizontal axis at a linear speed of 70 m/min. The residence time of the product in the drum is approximately 5 seconds.

The resulting products are substantially annular; the weight ratio mashed potato:breading material is approximately 5:1.

Example 3

Cylindrical pieces of ice-cream having a volume of approximately 3 cm$^3$ are produced by wire-cutting an extruded circular strand of ice-cream having a temperature of −4° C. and an overrun of 120%. The pieces of ice-cream having a diameter of 18 mm and a length of 12 mm are immediately transferred to a revolving drum having a diameter of 60 cm, the interior of which is kept at ambient temperature and which contains cocoa powder having an average particle size of between 0.001 and 0.05 mm. The revolving drum is rotated about a substantially horizontal axis at a linear speed of 70 m/min. The residence time of the product in the drum is approximately 10 seconds.

The resulting products are substantially annular; the weight ratio ice-cream: cocoa powder is approximately 20:1. The product is subsequently hardened to below −20° C.

I claim:

1. Method for preparing a food product comprising the steps of:
    extruding a plastic deformable food material into a strand;
    separating said strand into pieces; and
    rolling said pieces of plastic deformable food material in the presence of a particulate coating material in a revolving drum, thereby reshaping said pieces into roundish, coated bodies.

2. Method according to claim 1, characterized in that the linear speed revolution of the revolving drum is selectable to cause the roundish body to have a shape selected from the group of shapes consisting of substantially spherical, barrel-shaped, annular and dumbbell-shaped in cross-section.

3. Method according to claim 1, characterized in that the food material is frozen confection material.

4. Method according to claim 1, characterized in that the food material is selected from the group consisting of mashed potato, minced fish, dough, minced meat, vegetable paste and ragout.

5. Method according to claim 1, characterized in that the volume of each piece of food material is less than 250 cm$^3$ and preferably less than 40 cm$^3$.

6. Method according to claim 1, characterized in that each said piece has dimensions which are substantially equal in each main direction.

7. Method according to claim 1 for preparing a substantially spherical coated body, characterized in that each said piece has a volume of approximately 10 cm$^3$ and the food material has a viscosity comparable to that of ice cream at a temperature of −5° C. and the linear speed of rotation of the revolving drum is between 60 and 150 meters/min.

8. Method according to claim 1 for preparing a coated body having a substantially annular shape, characterized in that each said piece has a volume of approximately 10 cm$^3$ and the food material has a viscosity comparable to that of ice cream at a temperature of −5° C. and the linear speed of rotation of the revolving drum is between 60 and 250 meters/min.

* * * * *

UNITED STATES PATENT AND TRADEMARK OFFICE
CERTIFICATE OF CORRECTION

PATENT NO. : 4,976,978

DATED : 12/11/90

INVENTOR(S) : Gunther Schubert

It is certified that error appears in the above-identified patent and that said Letters Patent is hereby corrected as shown below:

```
Col. 3, line 34, "keep ability" should read --keepability--;
Col. 4, line 50, "and for" should read --for--;
Col. 6, line 42, "rotation" should read --revolution--;
Col. 6, lines 42-43, "between 60 and 150" should read
--between 40 and 60--;
Col. 6, line 50, "250" should read --150--.
```

Signed and Sealed this

Twelfth Day of May, 1992

Attest:

DOUGLAS B. COMER

*Attesting Officer*      Acting Commissioner of Patents and Trademarks